(12) United States Patent
Hoshino et al.

(10) Patent No.: US 8,834,612 B2
(45) Date of Patent: Sep. 16, 2014

(54) HYDROGEN SEPARATION APPARATUS AND PROCESS FOR MANUFACTURING THE SAME

(75) Inventors: Maki Hoshino, Kawasaki (JP); Takao Izumi, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 365 days.

(21) Appl. No.: 12/595,158

(22) PCT Filed: Jun. 5, 2008

(86) PCT No.: PCT/JP2008/060342
§ 371 (c)(1),
(2), (4) Date: Oct. 8, 2009

(87) PCT Pub. No.: WO2008/155992
PCT Pub. Date: Dec. 24, 2008

(65) Prior Publication Data
US 2010/0101419 A1    Apr. 29, 2010

(30) Foreign Application Priority Data

Jun. 20, 2007  (JP) .................................. 2007-162395
Jan. 21, 2008  (JP) .................................. 2008-010050

(51) Int. Cl.
*B01D 53/22* (2006.01)
*C01B 3/50* (2006.01)
*B01D 71/02* (2006.01)
*B01D 69/10* (2006.01)
*B01D 67/00* (2006.01)
*B01D 63/08* (2006.01)
*H01M 8/06* (2006.01)

(52) U.S. Cl.
CPC .............. *B01D 71/025* (2013.01); *B01D 53/22* (2013.01); *C01B 3/503* (2013.01); *B01D 2313/42* (2013.01); *H01M 8/0687* (2013.01); *C01B 2203/066* (2013.01); *B01D 71/022* (2013.01); *B01D 2256/16* (2013.01); *B01D 69/105* (2013.01); *C01B 2203/0405* (2013.01); *B01D 2325/04* (2013.01); *C01B 3/505* (2013.01); *H01M 2250/20* (2013.01); *B01D 67/0072* (2013.01); *Y02T 90/32* (2013.01);

*B01D 63/087* (2013.01); *B01D 67/0076* (2013.01); *B01D 67/0069* (2013.01)
USPC ................... 96/11; 95/43; 95/45; 95/55; 96/4

(58) Field of Classification Search
USPC .................................... 95/43, 45, 55; 96/4, 11
See application file for complete search history.

(56) References Cited

U.S. PATENT DOCUMENTS 3,022,187 A * 2/1962 Eyrand et al. ................. 428/545
(Continued)

FOREIGN PATENT DOCUMENTS

JP          7-185277 A         7/1995
(Continued)

OTHER PUBLICATIONS

Translation JP 2002/239352 A Aug. 27, 2002.*
(Continued)

*Primary Examiner* — Jason M Greene
*Assistant Examiner* — Anthony Shumate
(74) *Attorney, Agent, or Firm* — Foley & Lardner LLP (57) ABSTRACT

A hydrogen separation apparatus, provided with an independent hydrogen permeable membrane, capable of suppressing or preventing deformation of the hydrogen permeable membrane. The hydrogen separation apparatus includes a porous support member, an independent hydrogen permeable membrane disposed adjacent to the porous support member, and a joining member for joining the porous support member and the hydrogen permeable membrane. A production process for the hydrogen separation apparatus includes (1) disposing a joining member forming material at a surface side of a porous support member, to be opposite to an independent hydrogen permeable membrane, (2) disposing the independent hydrogen permeable membrane adjacent to the porous support member at the surface side of the porous support member to which surface side the joining member forming material is disposed, and (3) joining the porous support member and the independent hydrogen permeable membrane with the joining member forming material.

12 Claims, 5 Drawing Sheets

(56) References Cited

U.S. PATENT DOCUMENTS

| | | | |
|---|---|---|---|
| 5,007,944 A * | 4/1991 | Pinnau et al. | 95/51 |
| 5,393,325 A | 2/1995 | Edlund | |
| 5,989,319 A * | 11/1999 | Kawae et al. | 96/11 |
| 7,112,287 B2 * | 9/2006 | Yagi et al. | 216/56 |
| 7,396,384 B2 * | 7/2008 | Barker et al. | 95/55 |
| 7,655,075 B2 * | 2/2010 | Hofmann | 96/4 |
| 7,662,218 B2 * | 2/2010 | Maeda et al. | 96/4 |
| 7,771,520 B1 * | 8/2010 | Bossard | 96/11 |
| 2002/0020298 A1 * | 2/2002 | Drost et al. | 96/11 |
| 2003/0070548 A1 * | 4/2003 | Clausen | 96/4 |
| 2003/0233940 A1 * | 12/2003 | Takatani et al. | 96/4 |
| 2004/0245191 A1 | 12/2004 | Yagi et al. | |
| 2006/0260466 A1 * | 11/2006 | Tanaka et al. | 95/11 |
| 2007/0125702 A1 * | 6/2007 | Ramaswamy et al. | 210/490 |

FOREIGN PATENT DOCUMENTS

| | | |
|---|---|---|
| JP | 10-28850 A | 2/1998 |
| JP | 2002-52326 A | 2/2002 |
| JP | 2002-239352 A | 8/2002 |
| JP | 2003-165710 A | 6/2003 |
| JP | 2004-000862 A | 1/2004 |
| JP | 2004-121899 A | 4/2004 |
| JP | 2006-15266 A | 1/2006 |
| JP | 2006-204990 A | 8/2006 |
| WO | WO 2006/019805 A2 | 2/2006 |

OTHER PUBLICATIONS

Translation JP 2006/015266 A Jan. 19, 2006.*

Translation JP 2006/204990 A Aug. 10, 2006.*

Oxford English Dictionary, "membrane, n." Third edition, Jun. 2001, Oxford University Press. <http://www.oed.com/view/Entry/116312>.*

* cited by examiner

HYDROGEN SEPARATION APPARATUS AND PROCESS FOR MANUFACTURING THE
SAME

TECHNICAL FIELD

This invention relates to a hydrogen separation apparatus and a production process thereof, and more specifically to a hydrogen separation apparatus provided with an independent hydrogen permeable membrane and capable of suppressing or preventing damage of the hydrogen permeable membrane and a production process thereof.

BACKGROUND ART

Hitherto, a hydrogen permeable membrane has been studied in its use in order to supply hydrogen to a section requiring hydrogen. As a hydrogen permeable membrane, one provided with adsorption, dissociation, diffusion, combining ability and the like is desired. A typical example of the hydrogen permeable membrane is one formed of palladium alloy. However, palladium is a noble metal and expensive, and therefore researches and developments are being extensively made on hydrogen permeable membranes formed of other metals such as vanadium alloy and niobium alloy.

Of these, it is recently studied that the hydrogen permeable membrane is used in a fuel cell system owing to elevation of interest in global environment. Specifically, in order to supply hydrogen gas to a fuel cell, the hydrogen permeable membrane has being studied as one to be used when hydrogen gas is separated from reformed gas after the reformed gas containing hydrogen is produced from liquid fuel.

The fuel cell generates electric power under electrochemical reaction using hydrogen as fuel and oxygen or air containing oxygen as oxidizing agent. In case of considering application to vehicles or the like, it is required to reduce the volume of a whole fuel cell system as small as possible.

Accordingly, it is desired that a fuel source is liquid as compared with gas, and the development of hydrogen permeable membranes to be useable for taking out hydrogen from liquid fuel is important.

As conventional hydrogen permeable membranes, one in which a coating film of a hydrogen separating metal is formed at the surface layer of a porous support member, for example. The hydrogen permeable membrane is improved in hydrogen permeating velocity as the thickness of the coating film decreases. Additionally, if the hydrogen permeable membrane can be thinner, the volume of the hydrogen separating apparatus is reduced. For example, if the thickness of the hydrogen permeable membrane is made $1/10$, the hydrogen permeating performance is 10 times, so as to make it possible to make the volume of the hydrogen separating apparatus $1/10$. In this case, the using amount of palladium becomes $1/100$, making it possible to largely lower the cost regardless of using expensive palladium.

For these reasons, it is required to thin the hydrogen permeable membranes, making studies to thin hydrogen permeable membranes having no pin hole (see Patent Citation 1).

Studies have been made also on independent hydrogen permeable membranes. The independent hydrogen permeable membranes are not required to be formed as coating films on a porous support member, and therefore hydrogen permeable membranes having no pin hole can be formed upon being thinned as compared with the coating film-type hydrogen permeable membrane.

However, thinning the membrane makes it difficult to obtain a sufficient strength, so that a structure for supporting the membrane becomes necessary in order to compensate the strength of the hydrogen permeable membrane.

For example, the following hydrogen separation apparatus is proposed (see Patent Citation 2): The hydrogen separating apparatus includes an independent and metallic hydrogen permeable membrane through which hydrogen can be selectively permeable, and a support section disposed adjacent to the above-mentioned hydrogen permeable membrane. The above-mentioned support section includes a contact section having a contact surface at least a surface side opposite to the above-mentioned hydrogen permeable membrane, the contact surface being in contact with the above-mentioned hydrogen permeable membrane, and a non-contact section forming a gas passage without contacting. A wall surface of the above-mentioned contact section serving as an interface between the above-mentioned contact section and the above-mentioned non-contact section includes an obtuse angle surface at an end section of the above-mentioned contact surface, the obtuse angle surface being set to form an obtuse angle relative to the above-mentioned contact surface (see Patent Citation 2).

Patent Citation 1: Japanese Patent Provisional Publication No. 2002-52326
Patent Citation 2: Japanese Patent Provisional Publication No. 2003-165710

DISCLOSURE OF THE INVENTION

Problems to be Solved by the Invention

However, in the hydrogen separation apparatus provided with an independent hydrogen permeable membrane, the hydrogen permeable membrane expands when it absorbs hydrogen, for example. Additionally, if the temperature in a using circumference is high, the diaphragm may deforms under a heat expansion. Further, hydrogen permeation is carried out using a difference in hydrogen partial pressure, and therefore the membrane may deforms under the effect of pressure difference. Particularly in an independent hydrogen permeable membrane, it is possible to thin the membrane whereas the membrane undergoes the effect of the pressure difference. These deformations might damage the diaphragm.

Figure 7:
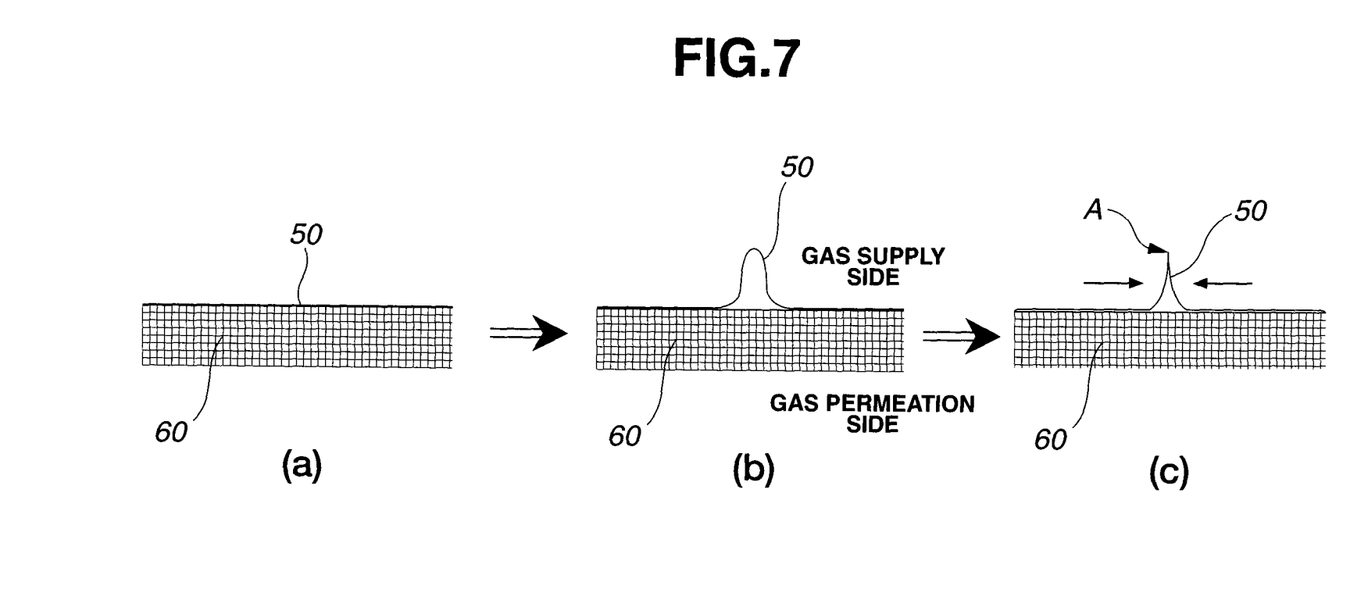
[FIG. 7] is an outline-explanative view showing a sectional state of a process in which a damage is formed in a gas separation apparatus provided with a conventional independent hydrogen permeable membrane.
Figure 8:
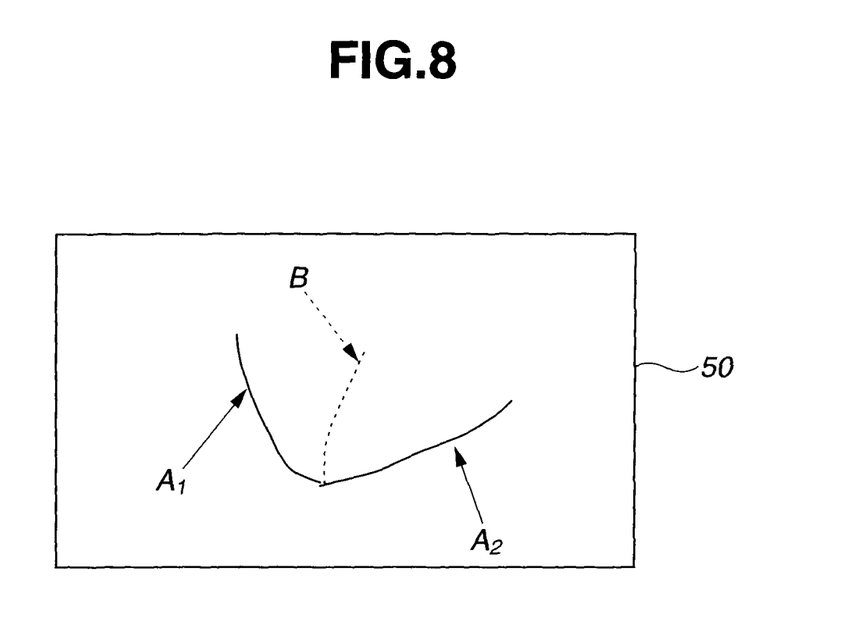
[FIG. 8] is a schematic top plan view showing a damaged section in a part of a gas separation apparatus provided with the conventional independent hydrogen permeable membrane.

FIG. 7 is an outline-explanative view showing the sectional state of a process in which a damage is formed in a gas separation apparatus provided with a conventional hydrogen permeable membrane. As shown at (a) of the same figure, usually, a hydrogen separation apparatus includes an independent hydrogen permeable membrane 50 and a porous support member 60 for ensuring the strength of the membrane. Additionally, the porous support member 60 has a flat plate-shaped structure. As shown at (b) of the same figure, when the porous support member 60 is located at the underside of the hydrogen permeable member 50 in case that gas is supplied from an upper direction, the porous support member 60 deforms in an upper direction where there is no porous support member 60 under the effects of absorption of hydrogen and heat. The hydrogen permeable membrane has a pressure difference between a gas supply side and a gas permeation side, in which a pressure at the gas supply side is higher than that at the gas permeation side. As a result, the hydrogen permeable membrane deforms as shown at (c) of the same figure. Specifically, when undergoing the pressure difference, the membrane is pressed from the opposite sides as indicated by arrows, thereby forming a sharpened ridge A. This sharpened ridge A deforms as (c)→(b)→(a) of the same figure when the pressure difference is softened or when hydrogen gas is released; however, it repeats a deformation of the membrane as (a)→(b)→(c)→(b)→(a) in the same figure under a using condition, and finally a crack is formed at the tip section of the ridge A thereby damaging the membrane. Additionally, FIG. 8 is a schematic top plan view showing a damaged section at a part of the gas separation apparatus provided with the conventional independent hydrogen permeable membrane. As shown in the same figure, when a ridge A1 and a ridge A2 are brought into contact with each other, no consistency is made between them so that a damaged section B indicated by a broken line may be produced.

This invention is made in view of the problems in such a conventional technique and has an object to provide a hydrogen separation apparatus provided with an independent hydrogen permeable membrane and capable of suppressing or preventing the deformation of the membrane, and a production process therefor.

Means for Solving the Problems

The present inventors have conducted eager studies in order to attain the above object. As a result, it has been found to attain the above object by, for example, providing a joining member for joining a porous support member and an independent hydrogen permeable membrane in a hydrogen separation apparatus providing with the porous support member and the independent hydrogen permeable membrane disposed adjacent to the porous support member, thereby completing the present invention.

In other words, a hydrogen separation apparatus according to the present invention is characterized by including a porous support member, an independent hydrogen permeable membrane disposed adjacent to the porous support member, and a joining member for joining the porous support member and the hydrogen permeable membrane.

Additionally, a production process for the hydrogen separation apparatus according to the present invention is an example of the production process for the hydrogen separation apparatus according to the present invention and is characterized by including steps (1) to (3) mentioned below.

(1) the step of disposing a joining member forming material at a surface side of a porous support member, to be opposite to an independent hydrogen permeable membrane, (2) the step of disposing the independent hydrogen permeable membrane adjacent to the porous support member at the surface side of the porous support member to which surface side the joining member forming material is disposed, and (3) the step of joining the porous support member and the independent hydrogen permeable membrane with the joining member forming material.

EFFECTS OF THE INVENTION

According to the present invention, for example, a joining member for joining a porous support member and an independent hydrogen permeable membrane is provided in a hydrogen separation apparatus provided with the porous support member and the independent hydrogen permeable membrane disposed adjacent to the porous support member, thereby providing a hydrogen separation apparatus provided with the independent hydrogen permeable membrane whose deformation can be suppressed or prevented, and a production process therefor. Additionally, by using this hydrogen separation apparatus, hydrogen can be stably obtained for a long time.

THE BEST MODE FOR CARRYING OUT THE INVENTION

Hereinafter, a hydrogen separation apparatus according to the present invention will be discussed.

As discussed above, the hydrogen separation apparatus according to the present invention includes a porous support member, an independent hydrogen permeable membrane disposed adjacent to the porous support member, hydrogen selectively permeating the hydrogen permeable membrane, and a joining member for joining the porous support member and the hydrogen permeable membrane.

By taking such a configuration, a damage due to deformation of the hydrogen permeable membrane can be suppressed or prevented.

Here, the "independent hydrogen permeable membrane" means a membrane in a condition where the membrane can be singly treated. For example, the independent hydrogen permeable membrane is different from a "coating film" formed on a support member formed of other materials than that of the independent hydrogen permeable member, by evaporation or the like.

Additionally, in a first preferred mode of the hydrogen separation apparatus according to the present invention, a plurality of joining members are disposed to the porous support member, in which a plurality of the joining members are disposed separate from each other by a certain distance in a direction parallel with the interface between the porous support member and the hydrogen permeable membrane.

By taking such a configuration, in other words, by joining a part of the hydrogen permeable membrane to the porous support member, a damage due to a deformation of the hydrogen permeable membrane under a stress concentration as a main factor can be suppressed or prevented.

It is to be noted that the "certain distance" used for disposing a plurality of the joining members separate from each other is defined by the shortest distance among the joining members in the present specification and the claims.

Further, in a second preferred mode of the hydrogen separation apparatus according to the present invention, let $t_{hpm}$. denote the thickness of the hydrogen permeable membrane, then the certain distance is preferably 200 $t_{hpm}$ or smaller and more preferably 50 to 200 $t_{hpm}$.

By taking such a configuration, a damage due to a deformation of the hydrogen permeable membrane under a stress concentration as a main factor can be suppressed or prevented.

Additionally, in a third preferred mode of the hydrogen separation apparatus according to the present invention, a thickness or length of the joining member in a normal line direction of the interface between the porous support member and the hydrogen permeable membrane is equivalent to or more than pore diameter of the porous support member at the interface with the hydrogen permeable membrane.

By taking such a configuration, a selective permeability for hydrogen in the hydrogen separation apparatus is maintained and a mechanical joining property between the hydrogen permeable membrane and the porous support member is made good, while a damage due to a deformation of the hydrogen permeable membrane can be further suppressed or prevented.

Further, in a fourth mode of the hydrogen separation apparatus, the joining member is formed of palladium, silver, palladium-silver, copper, copper-palladium, or any combinations thereof. For example, the joining member is in the form of alloy, mixture or the like.

By taking such a configuration, a selective permeability for hydrogen in the hydrogen separation apparatus is maintained and a mechanical joining property between the hydrogen permeable membrane and the porous support member is made good, while a damage due to a deformation of the hydrogen permeable membrane under a stress concentration as a main factor can be further suppressed or prevented.

Furthermore, in a fifth preferred mode of the hydrogen separation apparatus according to the present invention, the porous support member has a protective layer located at its surface side opposite to the hydrogen permeable membrane.

By taking such a configuration, for example, even in case that the porous support member formed of metal is used, a selective permeability for hydrogen in the hydrogen separation apparatus is maintained while a damage due to a deformation of the hydrogen permeable membrane can be further suppressed or prevented.

Hereinafter, some embodiments of the hydrogen separating apparatus according to the present invention will be discussed with reference to drawings.

Figure 1:
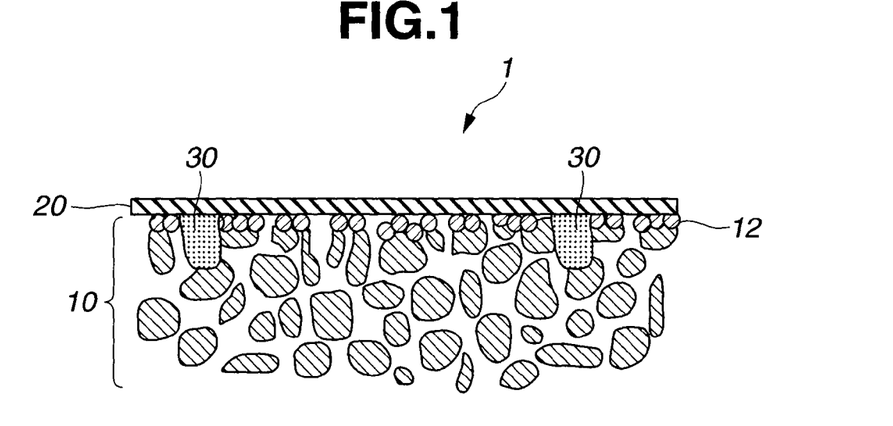
[FIG. 1] is a schematic fragmentary sectional view showing an example of the hydrogen separation apparatus which is circular in plan, relating to a first embodiment of the hydrogen separation apparatus according to the present invention.

FIG. 1 is a schematic fragmentary sectional view showing an example of the hydrogen separation apparatus which is circular in plan, relating to a first embodiment of the hydrogen separation apparatus according to the present invention.

As shown in the same figure, this hydrogen separation apparatus 1 includes a porous support member 10 which is circular in plan, an independent hydrogen permeable membrane 20 which is circular in plan, and joining members 30. Additionally, the porous support member 10 has a protective layer 12 at its surface side opposite to the hydrogen peinieable membrane 20. Further, hydrogen is allowed to selectively permeate the hydrogen permeable membrane 20, in which the hydrogen permeable membrane 20 is disposed adjacent to the porous support member 10. Furthermore, the joining member 30 join the porous support member 10 and the hydrogen permeable membrane 20, and penetrate pores of the porous support member 10.

It is to be noted that the protective layer 12 may be a continuous layer or a discontinuous layer in a direction parallel with the interface between the porous support member 10 and the hydrogen permeable membrane 20.

Figure 2:
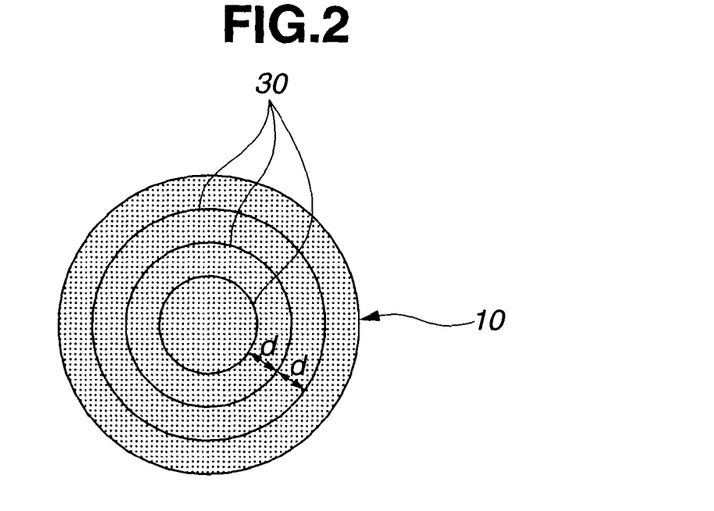
[FIG. 2] is a top plan view of the hydrogen separation apparatus (without a hydrogen permeable membrane) which is circular in plan and shown in FIG. 1.

Additionally, FIG. 2 is a top plan view of the hydrogen separation apparatus (without the hydrogen permeable membrane) which is circular in plan and shown in FIG. 1.

As shown in the same figure, a plurality of the joining members 30 are disposed to the porous support member 10 which is circular in plan. The joining members 30 are disposed separate from each other by the certain distance in a direction parallel with the interface between the porous support member 10 and the hydrogen permeable membrane (not shown). In case of this embodiment, the joining members 30 are coaxially disposed separate from each other by the certain distance. It is to be noted that the certain distance d is indicated in the same figure.

Figure 3:
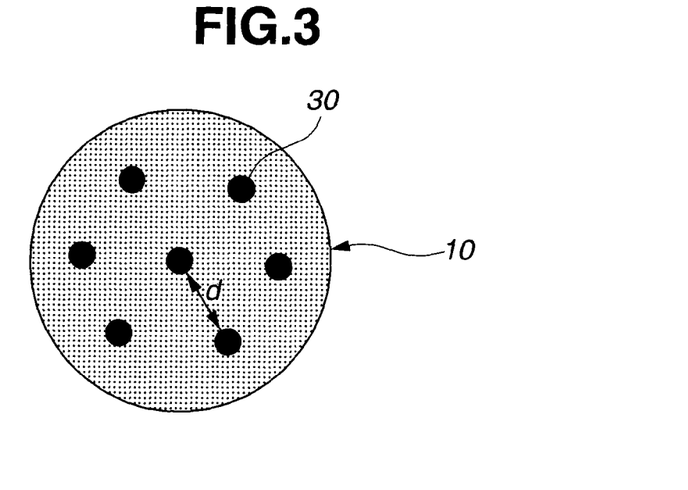
[FIG. 3] is a top plan view of another example of the hydrogen separation apparatus (without the hydrogen permeable membrane) which is circular in plan.

Further, FIG. 3 is a top plan view of the hydrogen separation apparatus (without the hydrogen permeable membrane) which is circular in plan and relates to another example.

As shown in the same figure, in case of this example, the joining members 30 are disposed at the lattice points constituting a hexagonal lattice in plan and separate from each other by the certain distance. It is to be noted that the certain distance d is indicated in the same figure.

Figure 4:
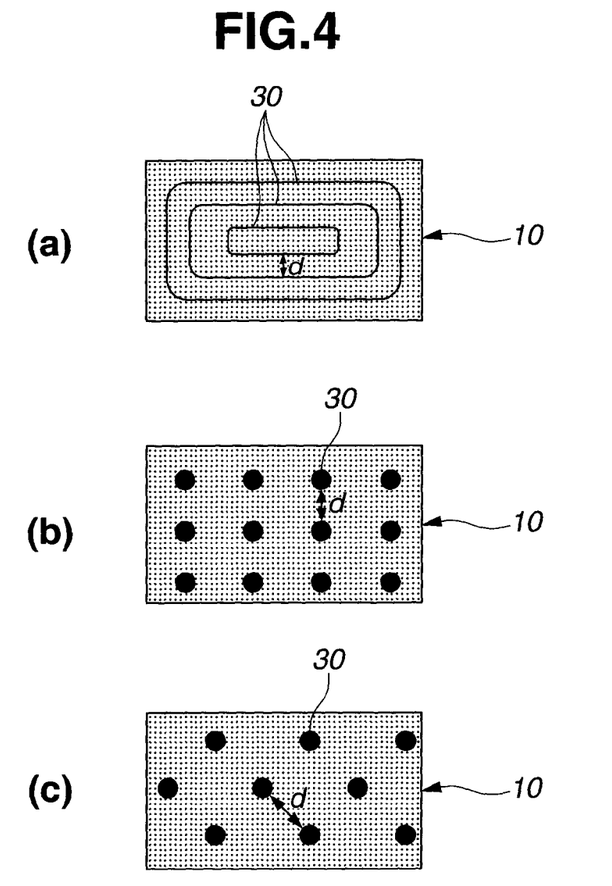
[FIG. 4] includes top plan views (a) to (c) showing respectively first to third examples of the hydrogen separation apparatus (without the hydrogen permeable membrane) which is rectangular in plan, relating to the first embodiment of the hydrogen separation apparatus according to the present invention.

Furthermore, FIG. 4 includes top plan views (a) to (c) which are respectively of first to third examples of the hydrogen separation apparatus (without the hydrogen permeable membrane) which is rectangular in plan, and relates to a first embodiment of the hydrogen separation apparatus according to the present invention.

As shown at (a) of the same figure, in case of the first example, the joining members 30 are disposed to the porous support member 10 which is rectangular in plan, in such a manner as to form generally rectangles which are coaxial with each other and separate from each other by the certain distance. Additionally, as shown at (b) of the same figure, in case of the second example, the joining members are disposed at the lattice points constituting an orthogonal lattice in plan and separate from each other by the certain distance. Further, as shown at (c) of the same figure, in case of the third example, the joining members 30 are disposed at the lattice points constituting a tetragonal lattice in plan and separate from each other by the certain distance. The distance d is indicated at (a) to (c) of the same figure.

It is to be noted that the "generally rectangles" means rectangles whose corners are rounded.

Additionally, the arrangements of the joining members to the porous support member are not limited to those discussed above if deformation of the hydrogen permeable membrane is suppressed or prevented. In other words, the joining members are disposed, for example, to form concentric ovals, a parabola, or a hyperbola, or disposed at the lattice points constituting an oblique lattice in plan or a rhombus lattice in plan. Additionally, it is unnecessary to regularly dispose the joining members as discussed above. For example, the joining members may be irregularly disposed taking account of sections to which deformation tends to be concentrated.

Additionally, let $t_{hpm}$ denote the thickness of the hydrogen permeable membrane, then the certain distance is preferably 200 $t_{hpm}$ or smaller and more preferably 50 to 200 $t_{hpm}$.

When the above-mentioned certain distance exceeds 200 $t_{hpm}$, the hydrogen permeable diaphragm may largely deform, and additionally the stress concentration in the hydrogen permeable diaphragm may not be effectively dispersed. However, when the certain distance is 50 $t_{hpm}$ or more, the stress concentration can be suppressed while suppressing or preventing a damage due to deformation of the diaphragm.

Further, the above-mentioned certain distance is not required to be constant for all of a plurality of the joining members, so that the certain distances for the joining members may be partly constant. Specifically, for example, a rate at which hydrogen can be absorbed and a rate at which the membrane expands change according to the material of the hydrogen permeable membrane, and therefore it is preferable that the certain distances are set at values according to these.

Figure 5:
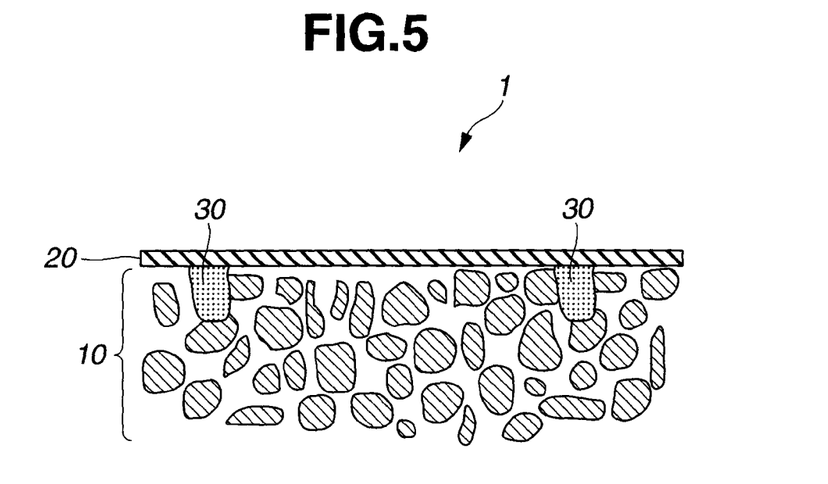
[FIG. 5] is a schematic fragmentary sectional view showing a further example of the hydrogen separation apparatus which is circular in plan, relating to a second embodiment of the hydrogen separation apparatus according to the present invention.

FIG. 5 is schematic fragmentary sectional view showing a further example of the hydrogen separation apparatus which is circular in plan, and relates to a second embodiment of the hydrogen separation apparatus according to the present invention.

As shown in the same figure, this hydrogen separation apparatus is the same as that of the above-mentioned first embodiment with the exception that the porous support member 10 is not provided with a protective layer at its surface side opposite to the hydrogen permeable membrane 20.

Here, the detail of each configuration will be discussed; however, the present invention is not necessarily limited to this.

For example, in the above-mentioned first embodiment, the above-mentioned porous support member 10 is specifically provided with the protective layer 12 which will be discussed in detail after, and therefore the strength of the hydrogen permeable diaphragm can be reinforced. The porous support member 10 is, for example, formed of ceramic such as alumina, silica, zirconia, cordierite or the like, or metal such as stainless steel or the like; however, the material of the porous support member is not limited to these if hydrogen permeated the hydrogen permeable membrane can permeate the material.

Additionally, the pore diameters of the porous support member are, for example, preferably 0.05 to 1 μm, more preferably 0.1 to 0.8 μm and much more preferably 0.2 to 0.5 μm, though the pore diameter is not particularly limited. In the porous support member, the pore diameters may be uniform or have a distribution, in which the pore diameters at a surface side opposite to the hydrogen permeable membrane are small as compared with those at other portions, for example, in case that a skewed distribution of the pore diameters is formed in a direction of thickness of the porous member.

Further, the thickness of the porous support member is, for example, preferably 0.05 to 1 mm and more preferably 0.1 to 0.8 mm, though the thickness is not necessarily limited to these.

When the thickness of the porous support member is less than 0.05 mm, an anchor effect of the joining member may not be maintained while the strength for supporting the hydrogen permeable diaphragm may not be sufficient.

When the thickness of the porous support member exceeds 1 mm, the size of a reactor may be required to be large.

Furthermore, the porous support member is typically formed of metal foam, ceramic, or metal sintered body, however the material of the porous support member is not limited to these. In other words, the porous support member may be formed of a laminated product of, for example, ceramic and/or metal fiber Additionally, for example, in the above-mentioned second embodiment, the above-mentioned porous support member 10 is specifically not provided with the protective layer 12 and therefore preferably formed of, for example, ceramic such as alumina, silica, zirconia or cordierite though the material of the porous support member is not limited if the material does lower a hydrogen permeability upon being alloyed with the hydrogen permeable membrane, improves the strength of the hydrogen permeable membrane and allows hydrogen permeated the hydrogen permeable membrane to pass through it.

It is to be noted that the pore diameters and thickness of the porous support member are the same as those in the above-mentioned first embodiment. Such a porous support member is preferably and typically formed of a sintered body of ceramic or a laminated product of ceramic.

Additionally, it is preferable that the protective layer 12 is formed of a material which prevents alloying of it with the hydrogen permeable membrane at a surface side opposite to the hydrogen permeable membrane, for example. The material of the protective layer is not limited; however, when the porous support member is formed of a metal, the material may contains a component which can form an alloy with the hydrogen permeable membrane, by which there is the possibility that the hydrogen permeability of the hydrogen permeable membrane lowers under this alloying.

Specifically, a protective layer may be formed at a surface side of the porous support member, opposite to the hydrogen permeable membrane. The protective layer is a layer containing alumina, silica, zirconia or the like, typically a layer formed of at least one of alumna, silica and zirconia. This protective layer is formed on the porous support member, for example, by sputtering or plating; however, the method of forming the protective layer is not necessarily limited to these. For example, the protective layer may be formed by impregnation.

Additionally, the thickness of the protective layer is preferably 0.05 to 2 μm and more preferably 0.05 to 1 μm, for example; however, the thickness is not limited to these.

When the thickness of the protective layer is less than 0.05 μm, the function of the protective layer may not be accomplished. When the thickness of the protective layer exceeds 2 μm, hydrogen permeated may be prevented from its diffusion.

Furthermore, as discussed above, the protective layer may be a continuous layer or a discontinuous layer in a direction parallel with the interface between the porous support member and the hydrogen permeable membrane. For example, in case that the porous support member is formed of a metal while the protective layer is the discontinuous layer, the joining members are disposed in voids so that the joining members join to the porous support member which the joining members are liable to join to as compared with the protective layer, thereby increasing a joinability of the joining members. This raises the freedom of locations at which the joining members are disposed.

Further, the above-mentioned hydrogen permeable membrane 20 contains, for example, palladium (Pd), vanadium (V), niobium (Nb), zirconium (Zr), or metal formed of any combinations of these.

Typically, examples of the hydrogen permeable membrane are a palladium membrane, a palladium alloy membrane, a vanadium alloy membrane, a niobium alloy membrane, a zirconium alloy membrane and the like. In case of using the vanadium alloy membrane, the niobium alloy membrane or the zirconium alloy membrane, palladium for dissociation or adsorption of hydrogen is required to exist at the outermost layer of these membranes. Hydrogen is allowed to permeate these membranes so that hydrogen can be selectively obtained. Further, in concrete, examples of the palladium diaphragm are a palladium-silver alloy diaphragm, a palladium-copper alloy diaphragm, and the like; however, the hydrogen permeable membrane is not limited to these.

Additionally, the above-mentioned hydrogen permeable membrane is an independent membrane having no pin hole, and has a thickness of preferably 20 μm or less, more preferably 0.1 to 20 μm, much more preferably 0.1 to 10 μm and further more preferably 0.1 to 5 μm; however, the thickness is not limited to these.

When the thickness of the hydrogen permeable membrane exceeds 20 μm, even a membrane of the coating film type where the membrane is not independent can be produced in a condition of having no pin hole. When the thickness of the hydrogen permeable membrane is less than 0.1 μm, such a membrane is difficult to be produced at the present time.

Furthermore, the above-mentioned joining members 30 are preferably formed of a material which does not remarkably lower the hydrogen permeability of the hydrogen permeable membrane, though the material is not particularly limited if the material can join the above-mentioned porous support member and the above-mentioned hydrogen permeable membrane in such a manner that a stress concentration does not occur in the independent hydrogen permeable membrane. If the hydrogen permeability is lost during alloying due to joining between the hydrogen permeable membrane and the joining members, a hydrogen permeation is difficult to be made through such a hydrogen permeability-lost portion, thereby reducing an effective area required for hydrogen permeation.

For example, the joining members 30 are formed of holmium (Ho) or yttrium (Y) or the like which has a joinability as a material.

It is to be noted that the "hydrogen permeability of the hydrogen permeable membrane" used here means an inherent hydrogen permeability of the hydrogen permeable membrane itself, i.e., a hydrogen permeability relative to a hydrogen permeation area of the hydrogen permeable membrane. Accordingly, in case that the membrane itself seems to be thickened upon joining of the hydrogen permeable membrane and the joining members, such a thickness increase amount is taken into consideration. Even upon taking the thickness increase amount into consideration, it is preferable that the hydrogen permeability does not lower 20% or more, and it is more preferable that the hydrogen permeability does not lower 10% or more.

In this regard, examples of materials of the joining members which have a joinability and do not remarkably lower the hydrogen permeability are the same as those of the hydrogen permeable membrane and ones which have a hydrogen permeability even upon being alloyed, such as palladium (Pd), silver (Ag), palladium-silver alloy (Pd—Ag), copper (Cu), palladium-copper alloy (Pd—Cu), and the like. These may be used singly or in combination.

Additionally, in case that the above-mentioned hydrogen permeable membrane is formed, for example, of Pd or Pd—Ag, it is preferable to use the hydrogen permeable membrane in combination with the joining members which are formed of either one selected from the group consisting of Pd, Ag and Pd—Ag. In case that the above-mentioned hydrogen permeable membrane is formed, for example, of Pd—Cu, it is preferable to use the hydrogen permeable membrane in combination with the joining members which are formed of either one selected from the group consisting of Pd, Cu and Pd—Cu.

In case of using Pd—Cu as the material of the joining members, it is preferable that the amount of Pd in Pd—Cu is 40 to 60 mol %. When the Pd amount is less than 40 mol %, a desired hydrogen permeability may not be obtained. Also when the Pd amount exceeds 60 mol %, the desired hydrogen permeability may not be obtained.

In case of using Pd—Ag as the material of the joining members, it is preferable that the amount of Pd in Pd—Ag is 60 mol % or more. When the Pd amount is less than 60 mol %, a desired hydrogen permeability may not be obtained.

As discussed above, an alloy composition range for obtaining the desired hydrogen permeability is wide in the case of Pd—Ag as compared with in the case of Pd—Cu, and therefore the material used for the joining members is preferably Ag as compared with Cu, and preferably Pd—Ag as compared with Pd—Cu.

Additionally, the thickness (or thickness in a direction of normal line of the interface between the porous support member and the hydrogen permeable membrane) of the above-mentioned joining members is equivalent to or more than the pore diameters of the porous support member at the interface with the hydrogen permeable diaphragm, though it is not particularly limited. In concrete, the thickness is preferably 0.1 to 2 μm and more preferably 0.1 to 1.5 μm.

When the above-mentioned thickness of the joining members is equivalent to or more than the pore diameters of the above-mentioned porous support member, the joining members tend to readily exhibit an anchor effect to the porous support member, thereby improving a mechanical joinability.

Next, a production process of the hydrogen separation apparatus will be discussed.

As discussed above, the production process of the hydrogen separation apparatus according to the present invention is an example of the production process of the above-mentioned hydrogen separation apparatus according to the present invention and includes (1) the step of disposing a joining member forming material at a surface side of a porous support member, to be opposite to an independent hydrogen permeable membrane, (2) the step of disposing the independent hydrogen permeable membrane adjacent to the porous support member at the surface side of the porous support member to which surface side the joining member forming material is disposed, and (3) the step of joining the porous support member and the independent hydrogen permeable membrane with the joining member forming material. This production process is a process for obtaining a desired hydrogen separation apparatus, so that the above-mentioned hydrogen separation apparatus according to the present invention can be easily produced.

Here, the "joining member forming material" includes a material which serves as the joining member as it is, and a joining member precursor which becomes the joining member upon undergoing various treatments such as drying, heating, reduction. Additionally, examples of the joining member precursor are solution and slurry containing metal serving as the joining member. Specifically, examples of the joining member precursor are a palladium nitrate solution, a silver nitrate solution, a copper nitrate solution, a palladium acetate solution, a silver acetate solution, a copper acetate solution, and the like.

It is to be noted that the above-mentioned hydrogen separation apparatus according to the present invention is not limited to one produced by such a production process.

Additionally, at the above-mentioned step (1), a method for disposing the joining member forming material is not particularly limited; however, examples of the method are a plating method, an impregnation method, a sputtering method, a spraying method, an ion implantation method, and the like. These may be carried out singly or in suitable combination.

For example, in case that the joining member forming material is disposed by the plating method or the impregnation method, it is sufficient that only positions at which the joining members are disposed, of the porous support member are dipped in a plating liquid, a solution or a slurry. Specifically, the joining members are disposed at desired positions and with desired thicknesses as discussed above by previously coating or filling a gel at positions at which no joining member is disposed, of the porous support member, and then by carrying out a dipping. By such a method, the joining members can be precisely disposed.

Additionally, the joining members can be disposed at the desired positions and with desired thicknesses as discussed above by dipping only positions at which the joining members are to be disposed, of the porous support member in the plating liquid, the solution or the slurry, and then by heating the porous support member at an opposite side which is not dipped. By such a method, the joining members can be relatively easily disposed.

In case of disposing the joining member forming material, for example, by the sputtering method, the spraying method or the ion implantation method, the joining members can be disposed at desired positions and with desired thicknesses as discussed above, for example, by masking only positions at which no joining member is disposed, of the porous support member. By such a method, the joining members can be disposed more precisely and relatively easily.

Further, at the above-mentioned step (3), it is preferable that the joining member forming material and the independent hydrogen permeable membrane are previously brought into tight contact with each other in order that they are joined with each other with the joining member forming material.

Normally, a heating treatment is carried out in order to make the joining. By such a method, there is a fear that the hydrogen permeable membrane makes its warping deformation under a thermal expansion or the like. Accordingly, as discussed above, the joining members and the hydrogen permeable membrane can be securely joined to each other by previously bringing the joining member forming material and the hydrogen permeable membrane into tight contact with each other as discussed above.

In order to previously bring the joining member forming material and the hydrogen permeable membrane into tight contact with each other, a plate serving as a weight may be mounted on or a pressure may be applied onto the hydrogen permeable membrane and the joining member forming material, for example.

The surface of the above-mentioned plate is required to be formed of a material which cannot be alloyed with the hydrogen permeable diaphragm, such as alumina or silica.

Additionally, in order to carry out the joining with the joining member forming material, the independent hydrogen permeable membrane is disposed adjacent to the porous support member at the surface side provided with the joining member forming material, and then the hydrogen permeable membrane and the joining member forming material are brought into tight contact with each other, typically followed by a joining treatment in vacuum or in the atmosphere of an inert gas such as nitrogen, argon or the like, or a reduction gas such as hydrogen or the like, or the like gas, at 500 to 800° C., preferably 550 to 800° C., and more preferably 600 to 750° C., for 0.5 to 12 hours and preferably 0.5 to 8 hours; however, joining treatment is not limited to these conditions. In order to carry out the joining, when a heating treatment is made, the heating treatment is preferably made at a temperature at which the joining is possible, taking account of the heat resistant temperature of the hydrogen permeable membrane. If the temperature is too high, there is a fear that the hydrogen permeable member makes its phase transition or damage. However, if a certain temperature is not reached, a sufficient joining cannot be accomplished thereby making it impossible to suppress or prevent damage of the hydrogen permeable membrane. Additionally, in case that the pressure (or pushing force) applied is large when the joining member forming material and the hydrogen permeable membrane are brought into tight contact with each other, the joining is possible to be made at a relatively low temperature. However, the pressure (or pushing force) is small, a high temperature may be required for the joining. Accordingly, it is preferable to suitably adjust the pressure (or pushing force) and the temperature when the joining is carried out.

The hydrogen separation apparatus provided with such a hydrogen permeable membrane can be used as a hydrogen separation apparatus which supplies a hydrogen-containing gas, for example, to a fuel cell or an internal combustion engine.

As the hydrogen separation apparatus for supplying hydrogen gas to a fuel cell or an internal combustion engine, it is preferable to be compact and capable of stably supplying hydrogen gas. In order to make the hydrogen separation apparatus compact, it is preferable to thin the hydrogen permeable membrane. Additionally, thinning the membrane can reduce the amount of palladium to be used, for example, thereby lowering a cost. Furthermore, the compact hydrogen separation apparatus can reduce a colorific value required for starting an operation, thereby raising an efficiency of a system in which the hydrogen separation apparatus is incorporated.

The hydrogen separation apparatus according to the present invention has the independent hydrogen permeable membrane which has no pin hole and capable of being thinned, and therefore the hydrogen separation apparatus is compact and provided with the joining members for joining the porous support member and the hydrogen permeable membrane, thereby making it possible to suppress or prevent deformation of the hydrogen permeable membrane and to stably supply hydrogen gas.

EXAMPLES

Hereinafter, the present invention will be discussed further in detail with reference to some Examples and Comparative Examples. Specifically, operations discussed in each Example mentioned below are carried out to produce the hydrogen separation apparatus as shown in FIG. 1 or FIG. 2, followed by evaluating the performance of the hydrogen separation apparatus.

Example 1

<Preparation of Porous Support Member>

Alumina was sputtered to a surface side opposite to a hydrogen permeable membrane, of a porous plate (having a diameter of 36 mm, a thickness of 0.5 mm and pore diameters of 0.2 to 0.4 μm) formed of SUS, thereby forming an alumina layer (having a thickness of 0.4 μm) serving as a protective layer, thus to obtain a porous support member.

<Preparation of Hydrogen Permeable Diaphragm>

A palladium membrane (having a diameter of 36 mm and a thickness of 5 μm=$t_{hpm}$) was prepared as the hydrogen permeable membrane.

<Production of Hydrogen Separation Apparatus>

Palladium as an example of the joining member forming material was disposed at the surface side provided with alumina layer, of the prepared porous support member, by a sputtering method (PVD). At this time, the distance among the joining members separate from each other is 100 $t_{hpm}$ (=500 μm), and the thickness of the joining members was 0.5 μm.

Next, the prepared hydrogen permeable membrane was disposed at the surface side provided with the joining member forming material, of the porous support member and adjacent to the porous support member.

Thereafter, a joining treatment was conducted at 600 to 700° C. in vacuum upon placing an alumina plate on the free surface of the hydrogen permeable diaphragm, and then the alumina plate was removed thereby obtaining a hydrogen separation apparatus of this Example.

Example 2

<Production of Hydrogen Separation Apparatus>

Palladium as an example of the joining member forming material was disposed at the surface side provided with alumina layer, of the porous support member prepared in Example 1, by a plating method. At this time, the distance among the joining members separate from each other is 100 $t_{hpm}$ (=500 μm), and the thickness of the joining members was 0.5 μm.

Next, the hydrogen permeable membrane prepared in Example 1 was disposed at the surface side provided with the joining member, of the porous support member and adjacent to the porous support member.

Thereafter, a joining treatment was conducted at 600 to 700° C. in vacuum upon placing an alumina plate on the free surface of the hydrogen permeable diaphragm, and then the alumina plate was removed thereby obtaining a hydrogen separation apparatus of this Example.

Example 3

<Production of Hydrogen Separation Apparatus>

Palladium as an example of the joining member forming material was disposed at the surface side provided with alumina layer, of the porous support member prepared in Example 1, by an impregnation method. Specifically, the porous support member was dipped in a dilute palladium nitrate solution, dried, fired and reduced. At this time, the distance among the joining members separate from each other was 50 $t_{hpm}$ (=250 μm), and the thickness of the joining members was 0.5 μm.

Next, the hydrogen permeable membrane prepared in Example 1 was disposed at the surface side provided with the joining member forming material, of the porous support member and adjacent to the porous support member.

Thereafter, a joining treatment was conducted at 600 to 700° C. in vacuum upon placing an alumina plate on the free surface of the hydrogen permeable diaphragm, and then the alumina plate was removed thereby obtaining a hydrogen separation apparatus of this Example.

Comparative Example

<Production of Hydrogen Separation Apparatus>

The hydrogen permeable membrane prepared in Example 1 was disposed at the side surface provided with the alumina layer, of the porous support member and adjacent to the porous support member.

Thereafter, a heat treatment was conducted at 600 to 700° C. in vacuum upon placing an alumina plate on the free surface of the hydrogen permeable diaphragm, and then the alumina plate was removed thereby obtaining a hydrogen separation apparatus of this Example.

[Performance Evaluation]

A hydrogen permeation test was conducted on the above-mentioned hydrogen separation apparatus of each Example in such a manner that hydrogen at 1 MPa was supplied at 400° C. for a certain time.

Figure 6:
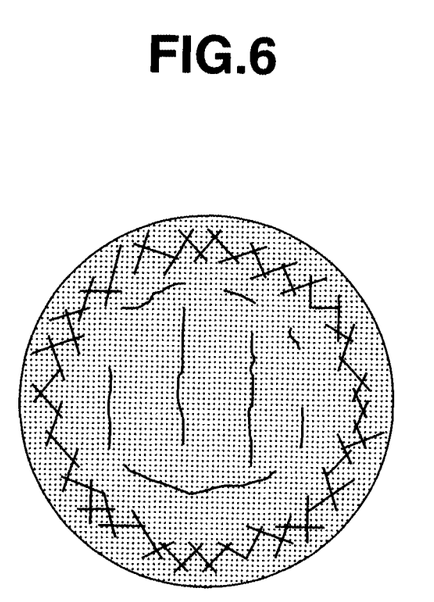
[FIG. 6] is a schematic view showing a damage state of a palladium membrane of Comparative Example 1.

As a result, in Examples 1 to 3 within the scope of the present invention, damage of the palladium diaphragm could not confirmed even during the test and after the test. However, in Comparative Example 1 outside the scope of the present invention, damage of the palladium diaphragm was confirmed together with formation of wrinkles or ridges as shown in FIG. 6 after the test.

Additionally, it was confirmed that joining the porous support member and a part of the hydrogen permeable membrane with the joining member was effective.

Hereinbefore, while the present invention has been discussed further in detail with reference to some embodiments and Examples, the present invention is not limited to these so that various changes and modifications may be made within the scope of the present invention.

In the above-mentioned embodiments and Examples, while the shape of the hydrogen separation apparatus has been discussed as being circular in plan or rectangular in plan, it is the matter of course that the present invention is not limited to these. For example, the shape of the hydrogen separation apparatus may be oval in plan or other shapes corresponding to the planar shape of a gas supply side.

Additionally, in the above-mentioned embodiments and Examples, while the case of supplying hydrogen has been discussed, the present invention may be applied to a case of supplying a reformed gas containing hydrogen, such as a case where the gas is supplied to a fuel cell, or to a case of supplying a fuel gas containing hydrogen, such as a case where the gas is supplied to an internal combustion engine.

EXPLANATION OF REFERENCE

1 hydrogen separation apparatus 20, 50 hydrogen permeable membrane protective layer 10, 60 porous support member 30 joining member A, A1, A2 ridge B damaged section

The invention claimed is:

1. A hydrogen separation apparatus comprising:
a porous support member;
an independent hydrogen permeable membrane disposed above the porous support member, the independent hydrogen permeable membrane being planar and different from a coating film; and
a joining member for joining the porous support member and the independent hydrogen permeable membrane, the joining member being independent from the independent hydrogen permeable membrane and fixedly disposed to the porous support member and being formed of at least one selected from the group consisting of palladium, silver, palladium-silver, copper and palladium-copper,
wherein the joining member includes a plurality of joining members disposed to the porous support member, wherein the joining members are disposed separate from each other by a certain distance in a direction parallel with an interface between the porous support member and the independent hydrogen permeable membrane,
wherein the independent hydrogen permeable membrane has a substantially uniform thickness $_{hmp}$.
wherein the certain distance is 200 $t_{tmh}$ or smaller,
wherein the joining member has a thickness equivalent to or more than a pore diameter of the porous support member at an interface of the porous support member and the independent hydrogen permeable membrane in a direction of a normal line of the interface between the porous support member and the independent hydrogen permeable membrane, wherein the independent hydrogen permeable membrane is singly treatable before the joining member joins the porous support member and the independent hydrogen permeable membrane, wherein the porous member is provided with a protective layer disposed at a Surface side opposite to the independent hydrogen permeable membrane, and wherein the porous support member and the protective layer exist on a same plane, which is parallel to the interface between the porous support member and the independent hydrogen permeable membrane.

2. A hydrogen separation apparatus as claimed in claim 1, wherein the certain distance is 50 to 200 $t_{hpm}$.

3. A process for producing the hydrogen separation apparatus as claimed in claim 1, comprising:
   (1) the step of disposing a joining member forming material at a surface side of the porous support member, to be opposite to the independent hydrogen permeable membrane;
   (2) the step of disposing the independent hydrogen permeable membrane above the porous support member at the surface side of the porous support member to which surface side the joining member forming material is disposed; and
   (3) the step of joining the porous support member and the independent hydrogen permeable membrane with the joining member forming material,
   wherein the step (1) is conducted such that, after the step (3), the joining member forming material turns into the plurality of joining members disposed to the porous support member, wherein the joining members are disposed separate from each other by a distance of 200 multiplied by $t_{hpm}$ or smaller, in a direction parallel with the interface between the porous support member and the independent hydrogen permeable membrane.

4. A process for producing the hydrogen separation apparatus as claimed in claim 3, wherein a method of disposing the joining member forming material at the step (1) is at least one selected from the group consisting of a plating method, an impregnation method, a sputtering method, a spraying method, and an ion implantation method.

5. A process for producing the hydrogen separation apparatus as claimed in claim 3. wherein the joining member forming material and the independent hydrogen permeable membrane are brought into contact with each other, prior to the step (3), in order to join the porous support member and the independent hydrogen permeable membrane with the joining member forming material at the step (3).

6. A hydrogen separation apparatus as claimed in claim 1, wherein the independent hydrogen permeable membrane has a thickness of 0.1 to 20 μm

7. A hydrogen separation apparatus as claimed in claim 1, wherein the independent hydrogen permeable membrane has a thickness of 0.1 to 10 μm.

8. A hydrogen separation apparatus as claimed in claim 1, wherein the independent hydrogen permeable membrane has a thickness of 0.1 to 5 μm.

9. A hydrogen separation apparatus as claimed in claim 1, wherein the independent hydrogen permeable membrane has a thickness of 20 μm or less.

10. A hydrogen separation apparatus as claimed in claim 1, wherein the protective layer comprises at least one selected from the group consisting of alumina, silica and zirconia.

11. A hydrogen separation apparatus as claimed in claim 1, wherein the protective layer is discontinuous and a joining member is disposed in a void of the protective layer.

12. A hydrogen separation apparatus as claimed in claim 1, Wherein the protective layer is formed of a material configured to prevent alloying of the protective layer with the independent hydrogen permeable membrane.

\* \* \* \* \*